United States Patent
Kurachi et al.

(10) Patent No.: US 8,218,303 B2
(45) Date of Patent: Jul. 10, 2012

(54) INFORMATION PROCESSING APPARATUS AND ELECTRONIC APPARATUS SYSTEM

(75) Inventors: Hideaki Kurachi, Kanagawa (JP); Masayoshi Koganei, Tokyo (JP)

(73) Assignee: Sony Corporation, Tokyo (JP)

( * ) Notice: Subject to any disclaimer, the term of this patent is extended or adjusted under 35 U.S.C. 154(b) by 396 days.

(21) Appl. No.: 12/541,291

(22) Filed: Aug. 14, 2009

(65) Prior Publication Data

US 2010/0053875 A1 Mar. 4, 2010

(30) Foreign Application Priority Data

Sep. 1, 2008 (JP) ................................. 2008-223678

(51) Int. Cl.
*H05K 7/14* (2006.01)
(52) U.S. Cl. ......... 361/679.21; 361/679.22; 361/679.08; 248/917
(58) Field of Classification Search ............. 361/679.21, 361/679.22, 679.26, 679.27, 679.09, 679.08, 361/679.57, 679.4, 679.41, 752; 235/462.43, 235/462.45, 462.46, 431; 312/223.1–223.2; 248/917–924
See application file for complete search history.

(56) References Cited

U.S. PATENT DOCUMENTS

| | | | | |
|---|---|---|---|---|
| 4,960,983 | A * | 10/1990 | Inoue | 235/449 |
| 7,826,205 | B2 * | 11/2010 | Smith | 361/679.02 |
| 7,830,655 | B2 * | 11/2010 | Takeguchi et al. | 361/679.33 |
| 2008/0168930 | A1 * | 7/2008 | Calero | 108/50.02 |

FOREIGN PATENT DOCUMENTS

| | | |
|---|---|---|
| JP | 3-233614 A | 10/1991 |
| JP | 11-219128 | 8/1999 |
| JP | 11-259003 | 9/1999 |
| JP | 2000-357027 | 12/2000 |
| JP | 2002-268768 A | 9/2002 |
| JP | 2004-272519 | 9/2004 |
| JP | 2005-85002 | 3/2005 |
| JP | 2005-316829 | 11/2005 |
| JP | 2006-107341 | 4/2006 |
| JP | 2006-285485 | 10/2006 |
| JP | 2007-48239 A | 2/2007 |
| JP | 2007-156555 | 6/2007 |

* cited by examiner

*Primary Examiner* — Jinhee Lee
*Assistant Examiner* — Ingrid Wright
(74) *Attorney, Agent, or Firm* — Oblon, Spivak, McClelland, Maier & Neustadt, L.L.P.

(57) ABSTRACT

An information processing apparatus includes a main body portion, a support portion, and a communication portion. The main body portion includes a display portion. The support portion supports the main body portion and forms a space below the main body portion in which information equipment connectable to the main body portion can be accommodated. The communication portion is provided to the support portion and performs communication with a noncontact-type communication medium.

5 Claims, 11 Drawing Sheets

INFORMATION PROCESSING APPARATUS AND ELECTRONIC APPARATUS SYSTEM

BACKGROUND OF THE INVENTION

1. Field of the Invention

The present invention relates to an information processing apparatus such as a desktop personal computer, and an electronic apparatus system.

2. Description of the Related Art

From the past, there has been a problem that desktop personal computers are not provided with a space for accommodating information equipment such as a keyboard, and an installation area of the personal computers becomes large. Two types of information processing apparatuses that can solve this problem are known. One is an information processing apparatus of a type that includes a foldable keyboard, and the other is an information processing apparatus of a type in which a keyboard can be inserted below a main body of the information processing apparatus.

For example, Japanese Patent Application Laid-open No. 2004-272519 (paragraph [0039], FIG. 1) (hereinafter, referred to as Patent Document 1) discloses a foldable-type information processor in which a keyboard is foldable with respect to a display portion of the information processor.

On the other hand, Japanese Patent Application Laid-open No. 2005-316829 (paragraph [0033], FIGS. 1 and 3) (hereinafter, referred to as Patent Document 2), for example, discloses a keyboard-insertion-type information processor that includes an accommodation portion capable of accommodating a keyboard at a lower end portion of a display portion of the information processor, and the keyboard is accommodated in the accommodation portion.

SUMMARY OF THE INVENTION

However, in the technique disclosed in Patent Document 1 above, there is a problem that the keyboard cannot be detached from the display portion and a user cannot use the keyboard freely at any position.

Moreover, in the technique disclosed in Patent Document 2, there is a problem that a plane area to install a communication portion for performing user authentication using an IC card or the like cannot be provided in the accommodation portion capable of accommodating the keyboard.

In view of the circumstances as described above, there is a need for an information processing apparatus and an electronic apparatus system capable of realizing space saving of an installation space of information equipment while still being provided with a communication portion.

According to an embodiment of the present invention, there is provided an information processing apparatus including a main body portion, a support portion, and a communication portion. The main body portion includes a display portion. The support portion supports the main body portion and forms a space below the main body portion in which information equipment connectable to the main body portion can be accommodated. The communication portion is provided to the support portion and performs communication with a noncontact-type communication medium.

In the embodiment of the present invention, the support portion can be used not only for accommodating the information equipment below the main body portion but also as the communication portion. Thus, as compared to a case where the communication portion and the support portion are provided in different areas, space saving of installation spaces of the information processing apparatus and information equipment becomes possible. Moreover, since the support portion can be used not only for supporting the main body portion but also for accommodating the information equipment below the main body portion, space saving of installation spaces of the information processing apparatus and information equipment becomes possible as compared to a case where the support and accommodation below the main body portion are realized by different components.

The information processing apparatus may further include an authentication processing portion to perform authentication processing based on information from the noncontact-type communication medium received by the communication portion. Here, the noncontact-type communication medium includes an IC card including an integrated circuit or the like. The authentication processing includes, for example, processing of conducting authentication through an exchange of information between the noncontact-type communication medium and the information processing apparatus in a non-contact manner using electromagnetic induction caused when a user brings the noncontact-type communication medium close to the communication portion of the support portion.

Accordingly, authentication processing can be carried out between the noncontact-type communication medium and the information processing apparatus.

The support portion may include a bottom plate portion that forms the space, and the bottom plate portion may be provided with the communication portion.

Accordingly, it is possible to take out, as well as placing the information equipment on the bottom plate portion, the information equipment from below the information processing apparatus and use the communication portion at the bottom plate portion for user authentication and the like.

The bottom plate portion may be provided with, on an upper surface thereof, a mark that indicates a position of the communication portion, and the communication portion may be provided at a position corresponding to the mark.

Accordingly, user authentication and the like can be carried out by bringing the noncontact-type communication medium close to the mark that indicates the position of the communication portion.

The support portion may include a side plate portion that determines a height of the space, and one surface of the side plate portion may be provided with a reinforcement portion.

Accordingly, the side plate portions can be reinforced.

A ceiling surface forming the space may be provided with a protrusion portion for preventing an unintentional operation to a press-type operation portion of the information equipment accommodated in the space.

Accordingly, when accommodating the information equipment in the space of the support portion, the information equipment can be pressed by the protrusion portion from an upper surface side thereof so that a predetermined distance is kept between the upper surface side of the information equipment and a lower end of the main body portion. As a result, in a case where keys and the like are provided on the upper surface of the information equipment, it is possible to prevent the keys from being pressed unintentionally when accommodating the information equipment in the space of the support portion.

The ceiling surface forming the space may include an inclined surface that is inclined downward from a front surface side to a back surface side of the main body portion.

Accordingly, it is possible to enlarge the accommodation space of the information equipment and, at the same time, prevent the information equipment from coming into contact with the support portion when the information equipment is accommodated in the space of the support portion.

A speaker portion may be provided in correspondence with the inclined surface.

Accordingly, it is possible to prevent the accommodation space of the information equipment from becoming small. Since the speaker portion is positioned at a lower end of the main body portion, the installation space of the information processing apparatus can be made smaller than a case where the speaker portion is provided on both side portions of the main body portion.

The main body portion may include a retention portion that is provided on the back surface on the other side of the front surface, the retention portion being capable of holding a cable connectable to the main body portion at a position apart from a terminal to which the cable is connected.

Accordingly, it is possible to prevent the cable from being tangled up with the information processing apparatus when the information equipment is accommodated in or taken out of the space of the support portion.

The main body portion may include an information processing portion for generating information to be displayed on the display portion.

Accordingly, the information equipment can be accommodated inside the space of the support portion of the information processing apparatus capable of displaying information generated by the information processing portion on the display portion.

According to an embodiment of the present invention, there is provided an electronic apparatus system including an information processing apparatus and information equipment. The information processing apparatus includes a main body portion, a support portion, and a communication portion. The main body portion includes a display portion. The support portion supports the main body portion and forms a space below the main body portion. The communication portion is provided to the support portion and performs communication with a noncontact-type communication medium. The information equipment is connectable to the main body portion and is capable of being accommodated in the space.

In the embodiment of the present invention, the support portion can be used not only for accommodating the information equipment below the main body portion but also as the communication portion. Thus, as compared to a case where the communication portion and the support portion are provided in different areas, space saving of installation spaces of the information processing apparatus and information equipment becomes possible. Moreover, since the support portion can be used not only for accommodating the information equipment below the main body portion but also for supporting the main body portion, space saving of installation spaces of the information processing apparatus and information equipment becomes possible as compared to a case where the support and accommodation below the main body portion are realized by different components. Furthermore, an area for installing the communication portion is smaller in the information equipment than in the support portion. Therefore, if the communication portion is provided to the information equipment, design of the information equipment may be impaired due to relationships in arrangement with respect to other components included in the information equipment. On the other hand, when the communication portion is provided to the support portion and no other components are provided to the support portion, design of the support portion is not impaired due to the communication portion.

As described above, according to the embodiments of the present invention, an accommodation space of information equipment can be saved while providing a communication portion.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

(Structure of Information Processing Apparatus)

Figure 1:
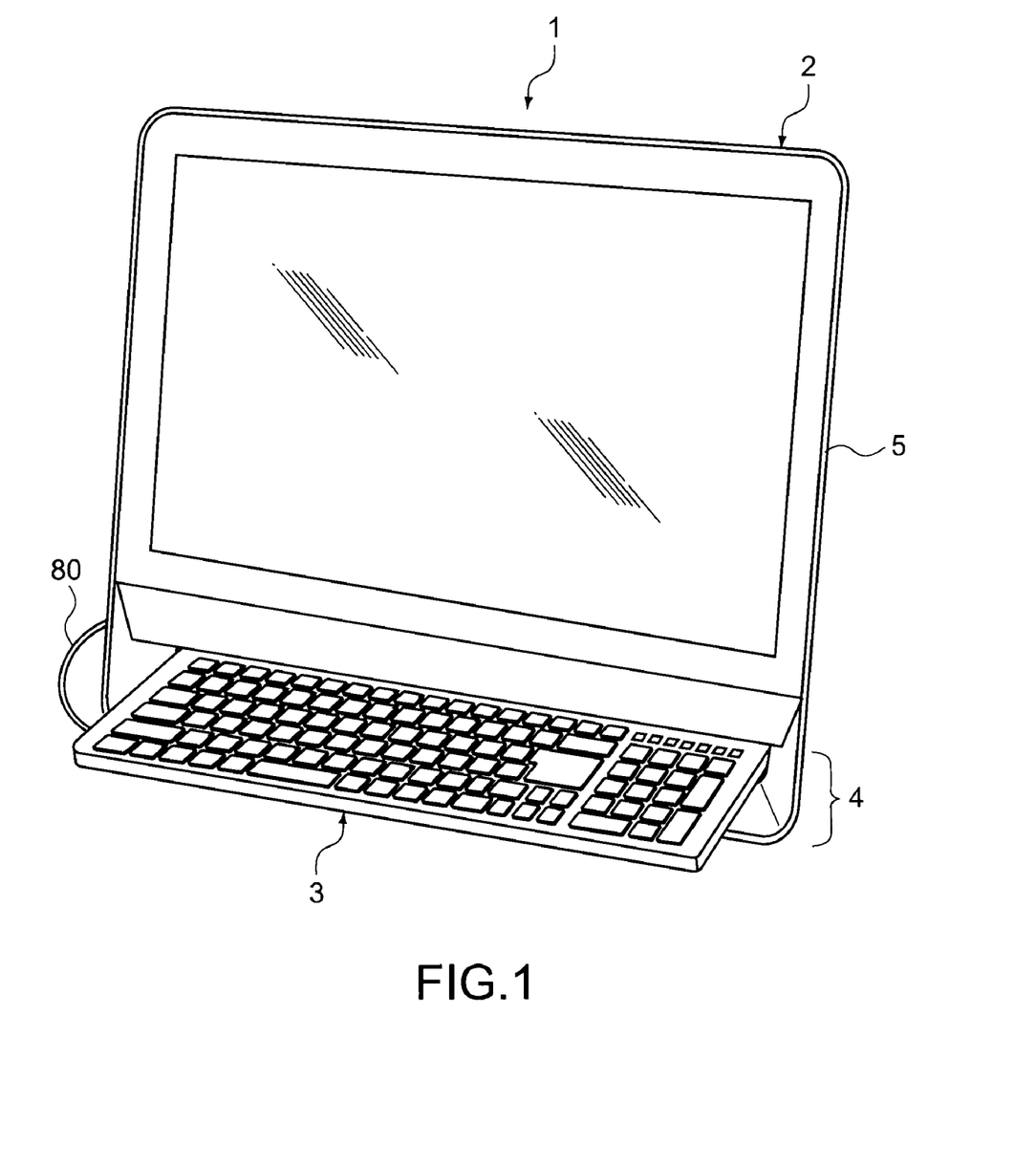
FIG. 1 is a perspective view of an electronic apparatus according to an embodiment of the present invention.
Figure 2:
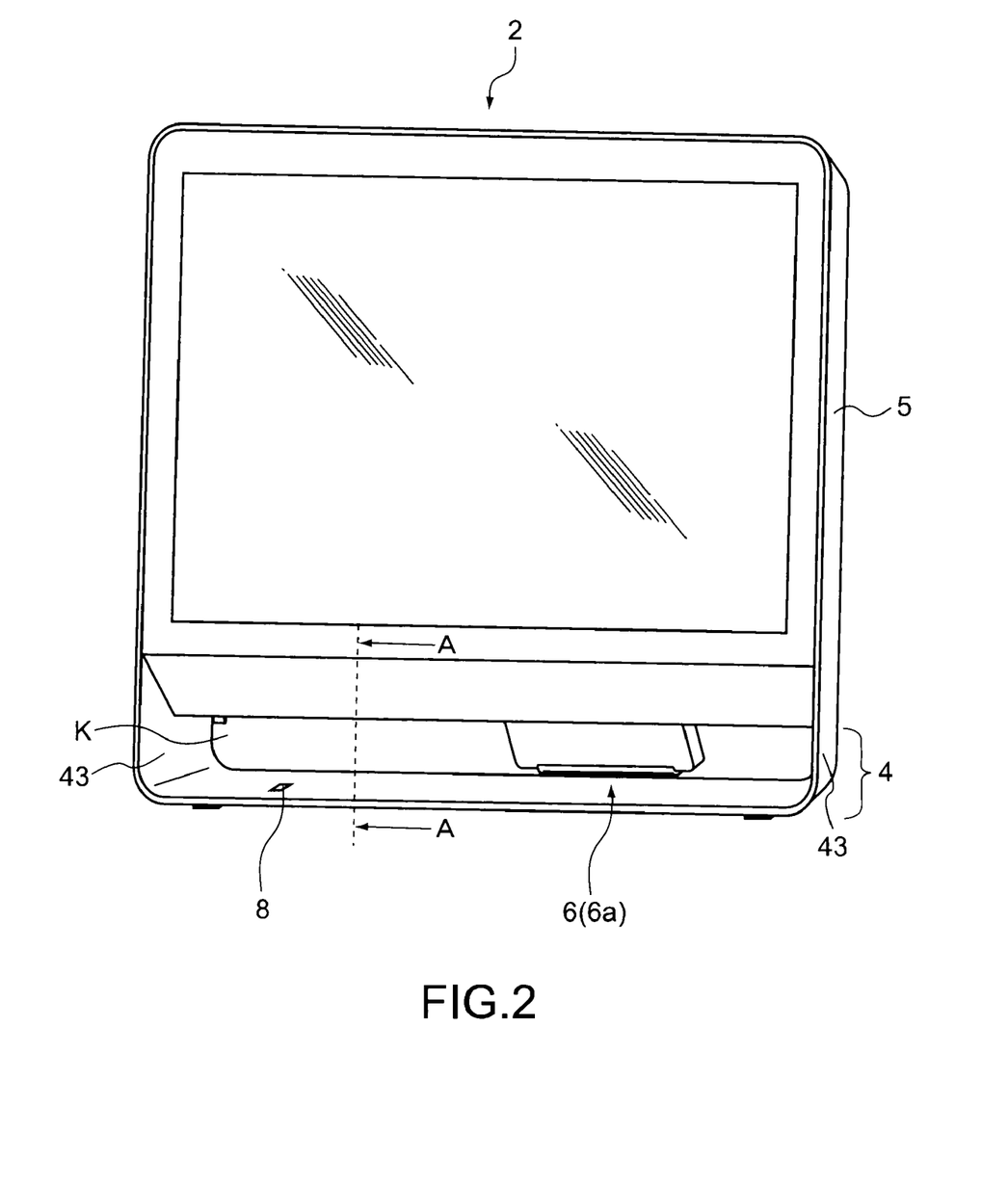
FIG. 2 is a perspective view of an information processing apparatus shown in FIG. 1.

FIG. 1 is a perspective view of an electronic apparatus according to an embodiment of the present invention, and FIG. 2 is a perspective view of an information processing apparatus shown in FIG. 1.

An electronic apparatus 1 includes an information processing apparatus 2 such as a desktop personal computer and a keyboard 3 placed and accommodated below the information processing apparatus 2. It should be noted that a mouse-type input apparatus (not shown) may be connected to the information processing apparatus 2.

The information processing apparatus 2 includes a support portion 4 capable of accommodating the keyboard 3 and a main body portion 5 as a main body of the information processing apparatus 2. The support portion 4 is provided below the main body portion 5 and supports the main body portion 5. The support portion 4 is capable of accommodating the keyboard 3 as shown in FIG. 1. The support portion 4 forms a space K for accommodating the keyboard 3 as shown in FIG. 2. The support portion 4 includes a bottom plate portion 6 on which the accommodated keyboard 3 is placed and a pair of side plate portions 43 provided on both sides of the bottom plate portion 6. The keyboard 3 is accommodated in the space K of the support portion 4 and placed on an arrangement surface 6a as an upper surface of the bottom plate portion 6. The arrangement surface 6a is flat. On the arrangement surface 6a of the bottom plate portion 6, a mark 8 that indicates a position of a communication port portion (e.g., FeliCa (registered trademark)) used for, for example, user authentication is displayed.

Figure 3:
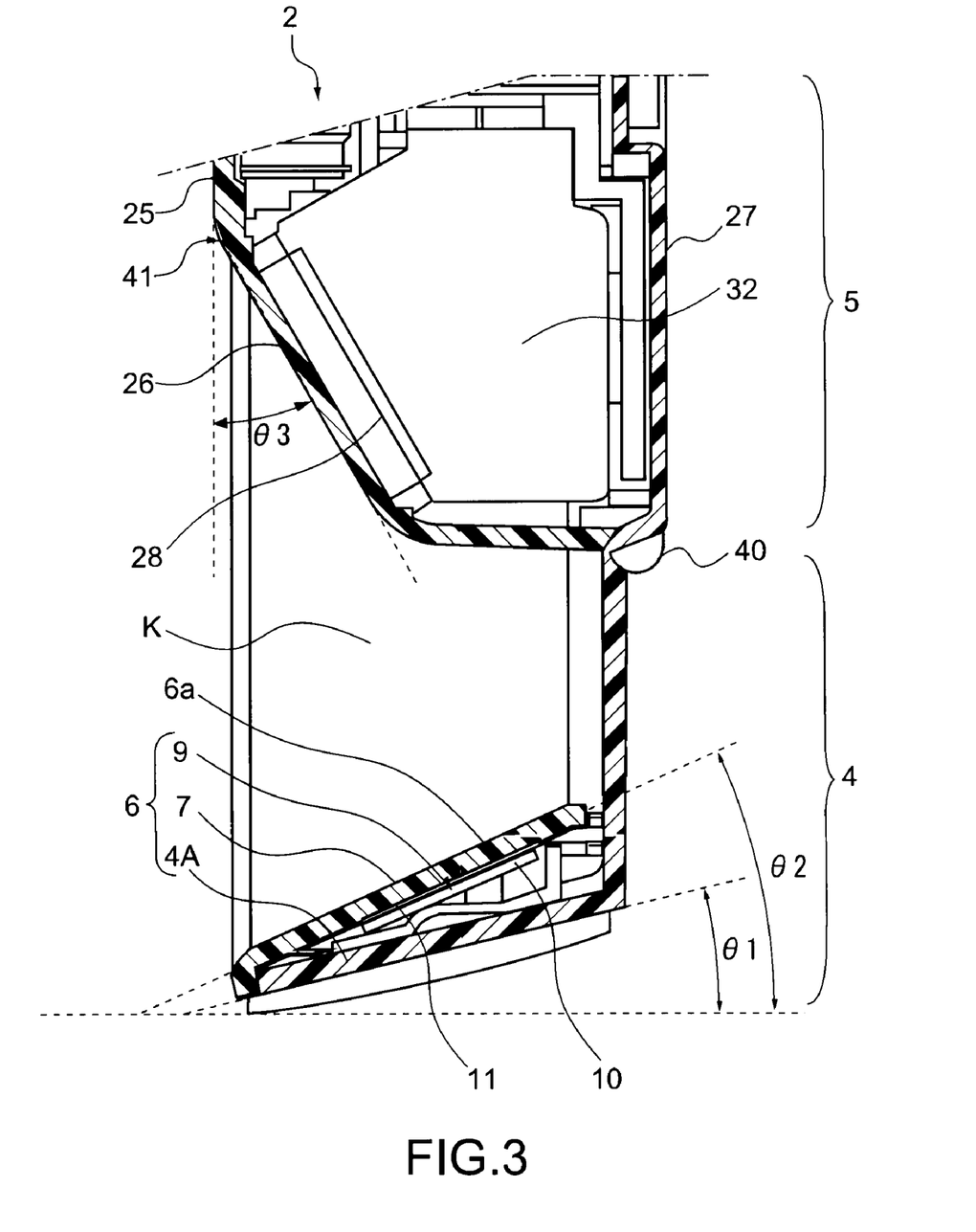
FIG. 3 is a cross-sectional diagram of the information processing apparatus shown in FIG. 2 taken along the line A-A.
Figure 4:
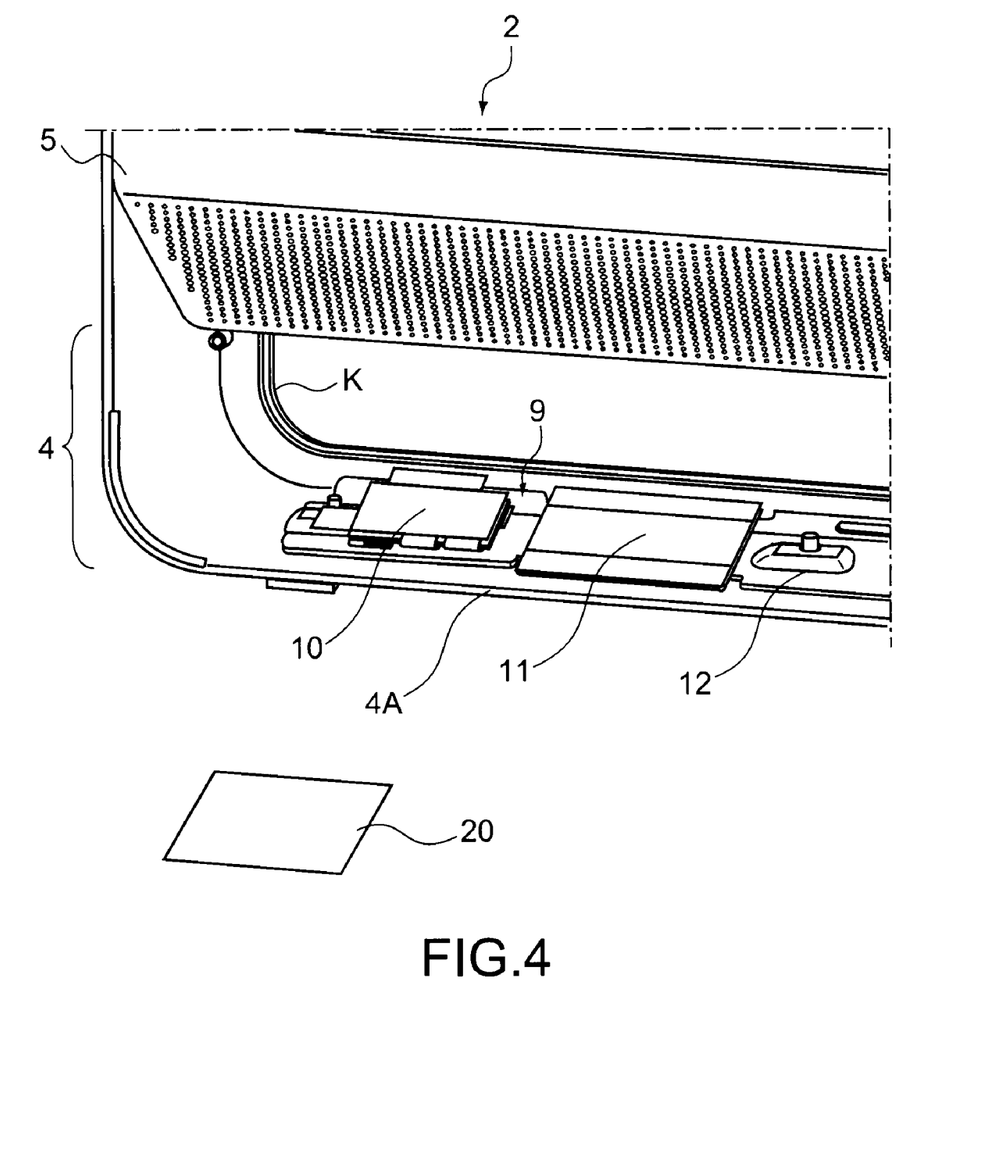
FIG. 4 is a partially-fractured enlarged diagram of a front-side cover constituting a support portion of the information processing apparatus.

FIG. 3 is a cross-sectional diagram of the information processing apparatus 2 shown in FIG. 2 taken along the line A-A, and FIG. 4 is a partially-fractured enlarged diagram of a front-side cover constituting the support portion 4 of the information processing apparatus 2.

The bottom plate portion 6 of the support portion 4 includes a base portion 4A constituting a bottom surface of the bottom plate portion 6, a cover portion 7 constituting a surface of the bottom plate portion 6, and a communication port portion 9 interposed between the base portion 4A and the cover portion 7.

The base portion 4A of the bottom plate portion 6 is inclined with respect to a front surface 25 and back surface 27 of the information processing apparatus 2. In other words, the base portion 4A is provided such that an angle θ1 is formed between the base portion 4A and a horizontal plane when the information processing apparatus 2 stands vertical to the horizontal plane as shown in FIG. 3, for example. The angle θ1 is, for example, 13 degrees.

The cover portion 7 of the bottom plate portion 6 is inclined with respect to the front surface 25 and back surface 27 of the information processing apparatus 2 as shown in FIG. 3. In other words, the cover portion 7 is provided such that an angle θ2 is formed between the cover portion 7 and the horizontal plane when the information processing apparatus 2 stands vertical to the horizontal plane as shown in FIG. 3. The angle θ2 is, for example, 24 degrees. It should be noted that the angles θ1 and θ2 are not limited to those values and can be changed as appropriate.

On the front surface 25 side of the main body portion 5, a cover portion 41 as a part of a cover that constitutes the front surface side of the main body portion 5 is provided. The cover portion 41 includes an inclined surface 26 inclined with respect to the front surface 25 of the information processing apparatus 2. The inclined surface 26 is inclined downward from the front surface 25 side to the back surface 27 side of the main body portion 5. An angle θ3 of the inclined surface 26 with respect to the front surface 25 is, for example, 30 degrees. A speaker 32 accommodated in the main body portion 5 at a lower end portion of the main body portion 5 includes a surface 28 substantially parallel to the inclined surface 26. It should be noted that the speaker 32 itself may be inclined so that a front surface of the speaker 32 becomes substantially parallel to the inclined surface 26.

The communication port portion 9 is incorporated between the cover portion 7 and the base portion 4A so as to correspond to the mark 8. The communication port portion 9 is a noncontact-type IC device incorporated in the bottom plate portion 6 of the support portion 4. The communication port portion 9 is used to exchange information between a noncontact-type IC card 20 to be described later and the information processing apparatus 2 in a noncontact manner using electromagnetic induction caused when the user brings the noncontact-type IC card 20 close to the mark 8 (communication port portion 9), for example. The communication port portion 9 includes a communication module 10, an antenna 11, a support bracket 12, and the like as shown in FIG. 4.

Figure 5:
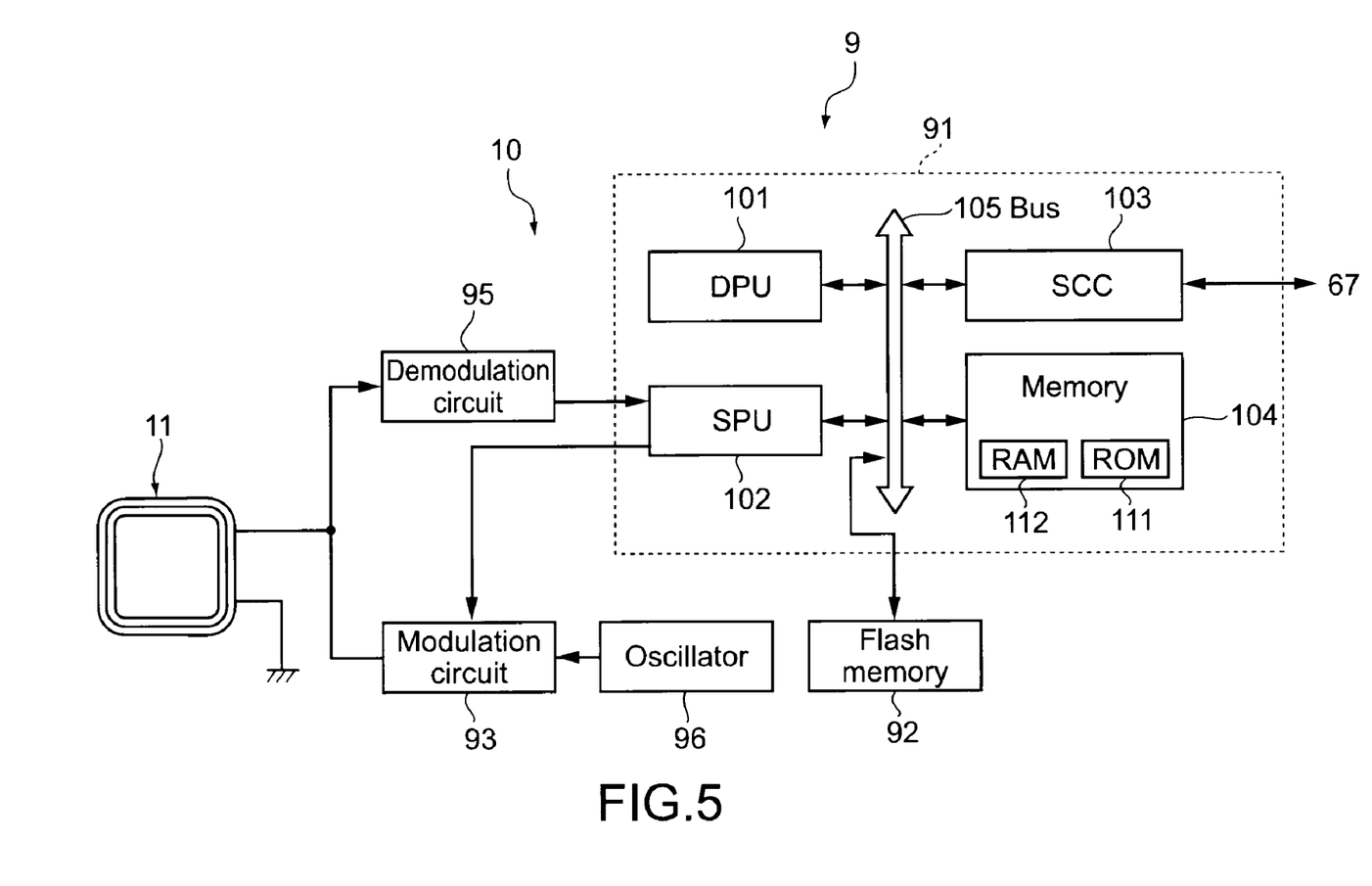
FIG. 5 is a block diagram showing an internal structure of a communication port portion.

FIG. 5 is a block diagram showing an internal structure of the communication port portion 9.

The communication port portion 9 includes the communication module 10, the antenna 11, and the like.

The communication module 10 includes an IC 91, a flash memory 92, a modulation circuit 93, a demodulation circuit 95, and an oscillator 96.

The IC 91 is constituted of a DPU (Data Processing Unit) 101 for performing data processing, an SPU (Signal Processing Unit) 102 for processing data to be transmitted to other electronic apparatuses (e.g., IC card 20) and data received from other electronic apparatuses, an SCC (Serial Communication Controller) 103 for performing communication with an input/output interface 67, and a memory 104 constituted of a ROM (Read Only Memory) 111 that stores in advance information necessary for the data processing and a RAM (Random Access Memory) 112 that temporarily stores data being processed. The DPU 101, the SPU 102, the SCC 103, and the memory 104 are mutually connected via a bus 105.

The flash memory 92 is connected to the bus 105 and stores predetermined data such as data necessary for authentication, for example.

The antenna 11 performs communication with an antenna of a noncontact-type IC device of another electronic apparatus (e.g., antenna 173 of IC card 20 shown in FIG. 6) using electromagnetic induction. More specifically, whether another electronic apparatus (IC card 20) is placed near the electronic apparatus is detected by monitoring a load condition with respect to the antenna 11, and data is transmitted to and received from the detected electronic apparatus (IC card 20).

The demodulation circuit 95 demodulates modulation waves (ASK (Amplitude Shift Keying) modulation waves) received via the antenna 11 and outputs demodulated data to the SPU 102.

The SPU 102 performs BPSK (Binary Phase Shift Keying) demodulation processing on the data input via the demodulation circuit 95 and performs BPSK modulation processing on, for example, a command that is to be transmitted to the IC card 20, and outputs the data and command to the modulation circuit 93 thereafter.

The DPU 101 receives inputs of data received from the demodulation circuit 95 via the SPU 102 and the bus 105 and a control signal input from the input/output interface 67 via the SCC 103 and the bus 105 and executes processing in accordance with those inputs. The DPU 101 also generates a command to be transmitted to another electronic apparatus and outputs it to the SPU 102 via the bus 105 or outputs data to be output to a CPU of the information processing apparatus 2 to the SCC 103 via the bus 105.

The modulation circuit 93 performs an ASK modulation on carrier waves of a predetermined frequency that are supplied from the oscillator 96 based on data supplied from the SPU 102 and outputs generated modulation waves via the antenna 11.

The SCC 103 supplies data input from the input/output interface 67 to the DPU 101 via the bus 105 or outputs data input from the DPU 101 via the bus 105 to the input/output interface 67.

Figure 6:
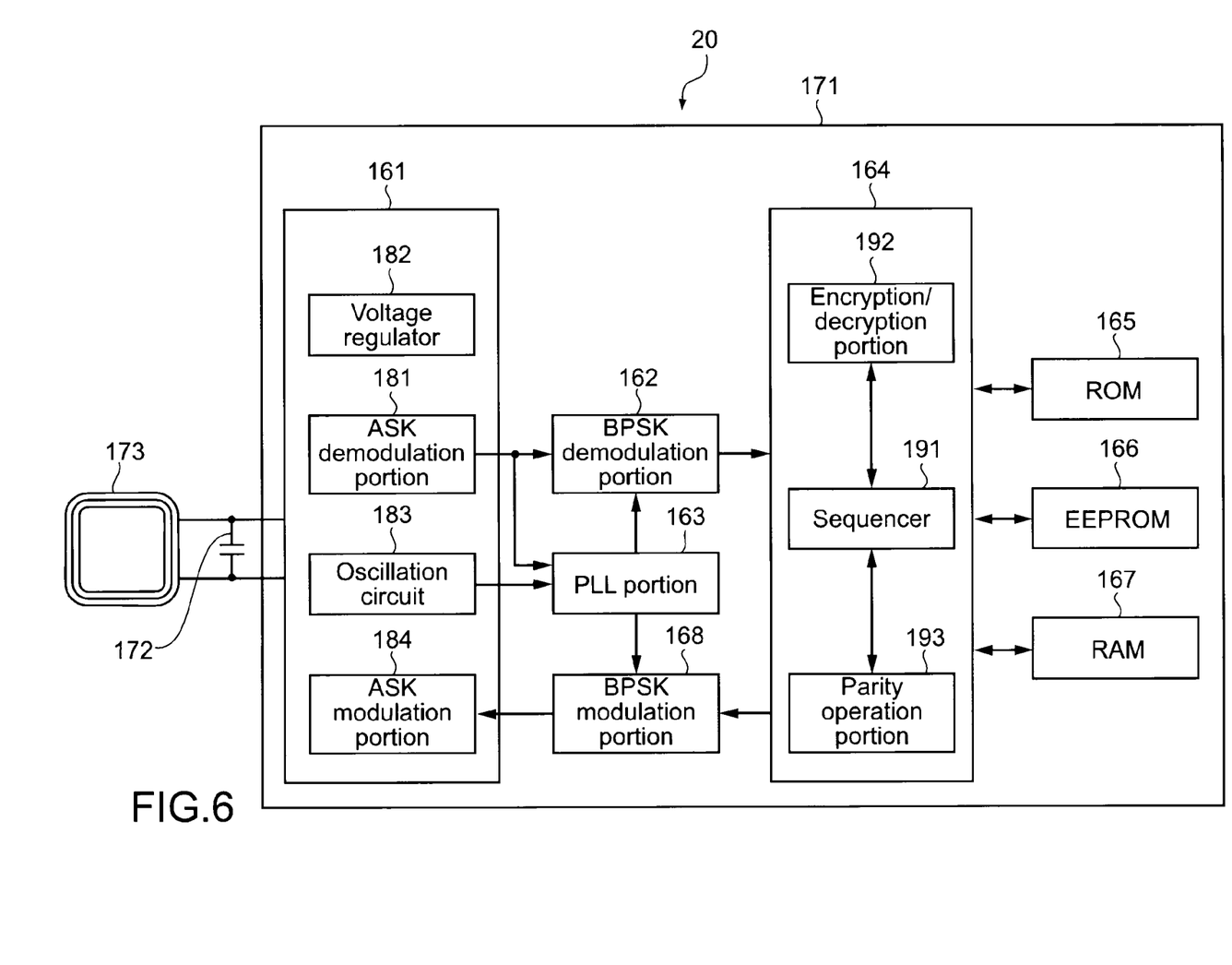
FIG. 6 is a block diagram showing an internal structure of a noncontact-type IC card.

FIG. 6 is a block diagram showing an internal structure of the noncontact-type IC card 20.

The IC card 20 includes, for example, an IC 171, a capacitor 172, and an antenna 173. The IC 171 includes an interface portion 161, a BPSK demodulation portion 162, a PLL (Phase Locked Loop) portion 163, an operation portion 164, a ROM 165, an EEPROM (Electrically Erasable and Programmable Read Only Memory) 166, a RAM 167, and a BPSK modulation portion 168.

The IC 171 of the IC card 20 receives the modulation waves transmitted from the communication port portion 9 via the antenna 173. The capacitor 172 constitutes an LC resonance circuit together with the antenna 173 and syntonizes (resonates) with electromagnetic induction waves of a predetermined frequency (carrier frequency).

An ASK demodulation portion 181 of the interface portion 161 detects and demodulates the modulation waves (ASK modulation waves) received via the antenna 173 and outputs the demodulated data to the BPSK demodulation portion 162 and PLL portion 163. A voltage regulator 182 stabilizes a signal detected by the ASK demodulation portion 181 and supplies the signal to the circuits as DC power supply. An oscillation circuit 183 oscillates a signal of the same frequency as a clock frequency of the data and outputs the signal to the PLL portion 163.

When data is transmitted to the communication port portion 9 from the IC card 20, an ASK modulation portion 184 switches on/off of a built-in switching device (not shown) in accordance with data supplied from the operation portion 164 via the BPSK modulation portion 168, and causes a predetermined load to be connected to the antenna 173 in parallel only when the switching device is turned on. As a result, a load in a direction of the antenna 173 seen from the antenna 11 electromagnetically coupled to the antenna 173 is caused to fluctuate.

Specifically, the ASK modulation portion 184 performs an ASK modulation on the modulation waves received via the antenna 173 by the fluctuation of the load on the antenna 173 (when data is received from the IC card 20, that is, when the IC card 20 is caused to transmit data, the communication port portion 9 sets a maximum amplitude of modulation waves to be output to be constant, and the modulation waves are subjected to the ASK modulation by a fluctuation of the load of the antenna 173) and transmits modulation components to the communication port portion 9 via the antenna 173 (causes a terminal voltage of the antenna 11 of the communication port portion 9 to fluctuate).

The PLL portion 163 generates, from data supplied from the ASK demodulation portion 181, a clock signal synchronized with that data and outputs the clock signal to the BPSK demodulation portion 162 and BPSK modulation portion 168. When the data demodulated by the ASK demodulation portion 181 is BPSK-modulated, the BPSK demodulation portion 162 demodulates the data (Manchester code decoding) based on the clock signal supplied from the PLL portion 163, and outputs the demodulated data to the operation portion 164.

When the data supplied from the BPSK demodulation portion 162 is encrypted, the operation portion 164 decrypts the data in an encryption/decryption portion 192 and processes the data in a sequencer 191 thereafter. It should be noted that when the data is not encrypted, the data supplied from the BPSK demodulation portion 162 is supplied directly to the sequencer 191 without passing through the encryption/decryption portion 192.

The sequencer 191 executes various types of processing in accordance with the input command. Specifically, the sequencer 191 writes or reads data to/from, for example, the EEPROM 166 and performs necessary operational processing and the like on other data. Furthermore, the sequencer 191 executes access control with respect to the EEPROM 166 by conducting authentication, management of the EEPROM 166, and the like.

A parity operation portion 193 of the operation portion 164 calculates, for example, as a parity, Reed-Solomon codes from data to be stored in the EEPROM 166 or data already stored in the EEPROM 166. In addition, the operation portion 164 outputs, after predetermined processing is executed in the sequencer 191, response data (data to be transmitted to communication port portion 9) corresponding to that processing to the BPSK modulation portion 168. The BPSK modulation portion 168 performs a BPSK modulation on the data supplied from the operation portion 164 and outputs the modulated data to the ASK modulation portion 184 of the interface portion 161.

The ROM 165 stores a program for the sequencer 191 to execute processing, data necessary for executing a program, and the like. The RAM 167 temporarily stores data being processed by the sequencer 191 or the like. The EEPROM 166 is a nonvolatile memory and continues storing data (e.g., birth date, credit card number, address, and name of user) even after the communication between the IC card 20 and the communication port portion 9 is ended and power supply is stopped.

(Transmission/Reception Operation)

Next, data transmission/reception processing between the communication port portion 9 and the IC card 20 will be described.

The communication port portion 9 described with reference to FIG. 5 monitors a load condition of the antenna 11 while predetermined electromagnetic waves are being radiated from the antenna 11, and stands by until a change in the load condition due to an approach of the IC card 20 is detected.

In the communication port portion 9, upon detection of an approach of the IC card 20, the SPU 102 of the IC 91 performs a BPSK modulation on data to be transmitted to the IC card 20 (e.g., command corresponding to processing executed by IC card 20 and data to be written to IC card 20) using rectangular waves of a predetermined frequency as carrier waves, and outputs generated modulation waves (BPSK modulation signals) to the modulation circuit 93.

The modulation circuit 93 performs an ASK modulation on the carrier waves output from the oscillator 96 using the input BPSK modulation signals and transmits the generated modulation waves (ASK modulation waves) to the IC card 20 via the antenna 11.

It should be noted that when not performing the transmission, the modulation circuit 93 generates, for example, high-level modulation waves out of two levels (high level and low level) of digital signals.

In the LC resonance circuit constituted of the antenna 173 and the capacitor 172 in the IC card 20 described with reference to FIG. 6, a part of the electromagnetic waves radiated by the antenna 11 of the communication port portion 9 is converted into electric signals, and the electric signals (modulation waves) are output to the interface portion 161 of the IC 171. Then, the ASK demodulation portion 181 of the interface portion 161 rectifies and smoothes the modulation waves and performs an envelope detection, and supplies the thus-generated signal to the voltage regulator 182 and, at the same time, extracts a data signal by suppressing a DC component of the signal and outputs the data signal to the BPSK demodulation portion 162 and the PLL portion 163.

Upon receiving the signal rectified and smoothed by the ASK demodulation portion 181, the voltage regulator 182 stabilizes the signal and supplies it as DC power supply to the respective circuits including the operation portion 164.

Upon receiving the data (BPSK modulation signal) from the ASK demodulation portion 181, the BPSK demodulation portion 162 demodulates the data in accordance with a clock signal supplied from the PLL portion 163 and outputs the demodulated data to the operation portion 164.

When the data supplied from the BPSK demodulation portion 162 is encrypted, the operation portion 164 supplies the data to the sequencer 191 so that the data is processed, after decrypting the data in the encryption/decryption portion 192. It should be noted that during this period, that is, until a response to the data transmitted to the IC card 20 is received after the transmission, the communication port portion 9 stands by while transmitting data with a value 1. Therefore, during this period, the IC card 20 is receiving modulation waves having a constant maximum amplitude.

Upon ending the processing, the sequencer 191 outputs response data (data to be transmitted to communication port portion 9) on the processing result or the like to the BPSK modulation portion 168. After performing a BPSK modulation on the input data, the BPSK modulation portion 168 outputs the data to the ASK modulation portion 184 of the interface portion 161.

Then, by causing the loads connected on both ends of the antenna 173 to fluctuate in accordance with the data from the BPSK modulation portion 168 using a switching device or the like, the ASK modulation portion 184 performs an ASK modulation on the received modulation waves (at a time the IC card 20 transmits data, a maximum amplitude of the modulation waves output from the communication port portion 9 is constant as described above) in accordance with data to be transmitted, thus causes a terminal voltage of the antenna 11 of the communication port portion 9 to fluctuate, and transmits the data to the communication port portion 9.

On the other hand, at a time the data from the IC card 20 is received, the modulation circuit 93 of the communication port portion 9 is still transmitting the (high level) data with a value 1. In the demodulation circuit 95, the data transmitted from the IC card 20 is detected based on a minute fluctuation (e.g., several-ten microvolt) of the terminal voltage of the antenna 11 electromagnetically coupled to the antenna 173 of the IC card 20.

Furthermore, in the demodulation circuit 95, the detected signal (ASK modulation waves) is amplified by a high-gain amplifier (not shown) and demodulated, and digital data obtained as a result of the amplification and demodulation is output to the SPU 102. The SPU 102 demodulates the input data (BPSK modulation signal) and outputs the data to the DPU 101 via the bus 105. The DPU 101 processes the data input from the SPU 102 and judges whether to end the communication based on the processing result. When it is judged to perform communication again, communication is performed between the communication port portion 9 and the IC card 20 as in the above case. On the other hand, when it is judged to end the communication, the communication processing between the communication port portion 9 and the IC card 20 is ended.

As described above, the communication port portion 9 uses an ASK modulation with a modulation degree k smaller than 1, for example, to transmit data to the IC card 20, and the IC card 20 executes, upon receiving the data, processing corresponding to that data and transmits data obtained as a result of the processing back to the communication port portion 9.

Figure 7:
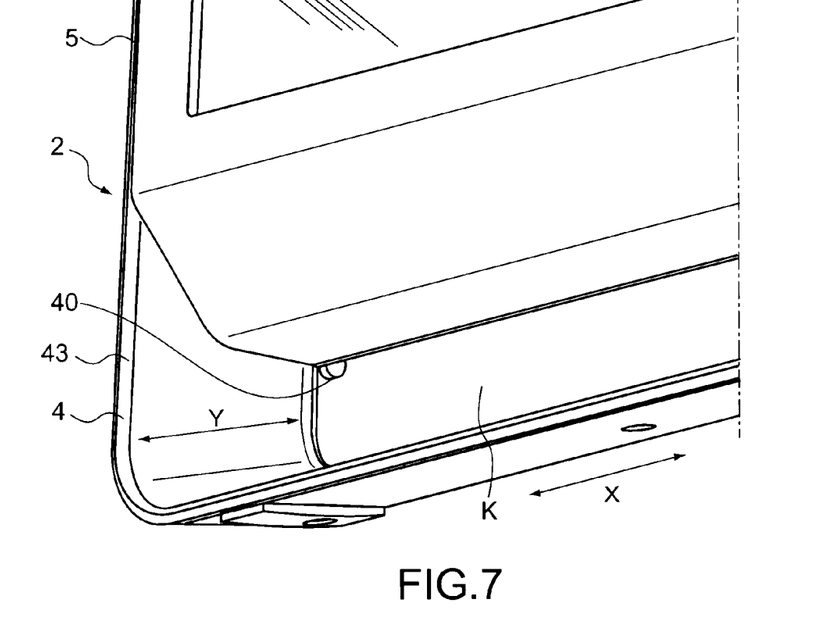
FIG. 7 is a partially-enlarged perspective view of a protrusion portion provided to a main body portion of the information processing apparatus.

FIG. 7 is a partially-enlarged perspective view of a protrusion portion provided to the main body portion 5 of the information processing apparatus 2.

The main body portion 5 of the information processing apparatus 2 is provided with, on a lower end surface thereof (ceiling surface), a protrusion portion 40 that protrudes toward the space K. The protrusion portion 40 is provided plurally and symmetrically (symmetric in X direction) with, for example, a center of the information processing apparatus 2 in a width direction (X direction) as a center. The protrusion portions 40 are provided on the back surface 27 side of the information processing apparatus 2 in a thickness direction (Y direction) of the information processing apparatus 2. The protrusion portions 40 are provided so as to protrude near the side plate portions 43 of the support portion 4. A shape of the protrusion portions 40 is a semicircle, and the protrusion portions 40 are provided so that a curved surface of a semicircle of each of the protrusion portions 40 faces downward. As a result, a surface that comes into contact with the keyboard 3 accommodated in the support portion 4 becomes a curved surface. An elastomer is used as a constituent material of the protrusion portions 40, for example.

Figure 8:
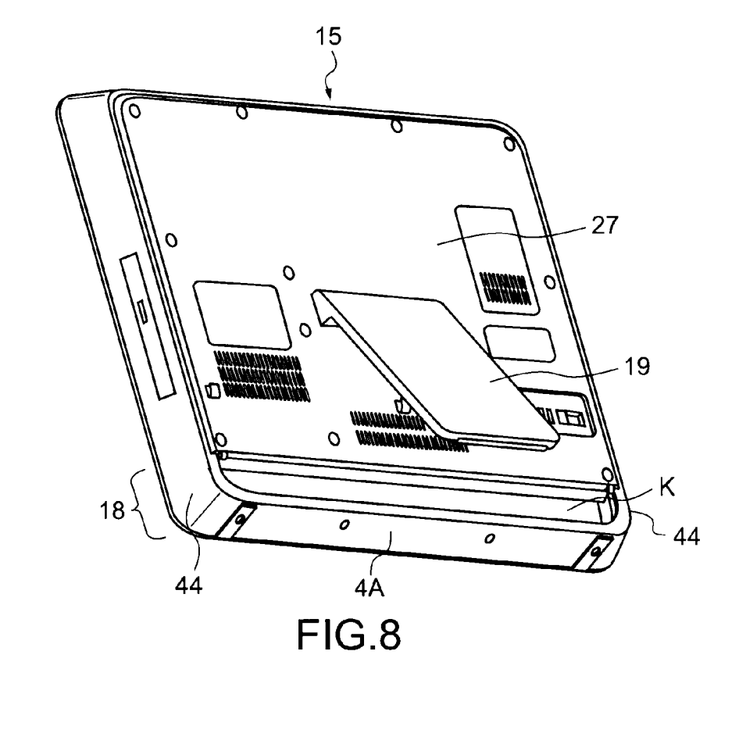
FIG. 8 is a perspective view of a back-side cover of the information processing apparatus shown in FIG. 1.
Figure 9:
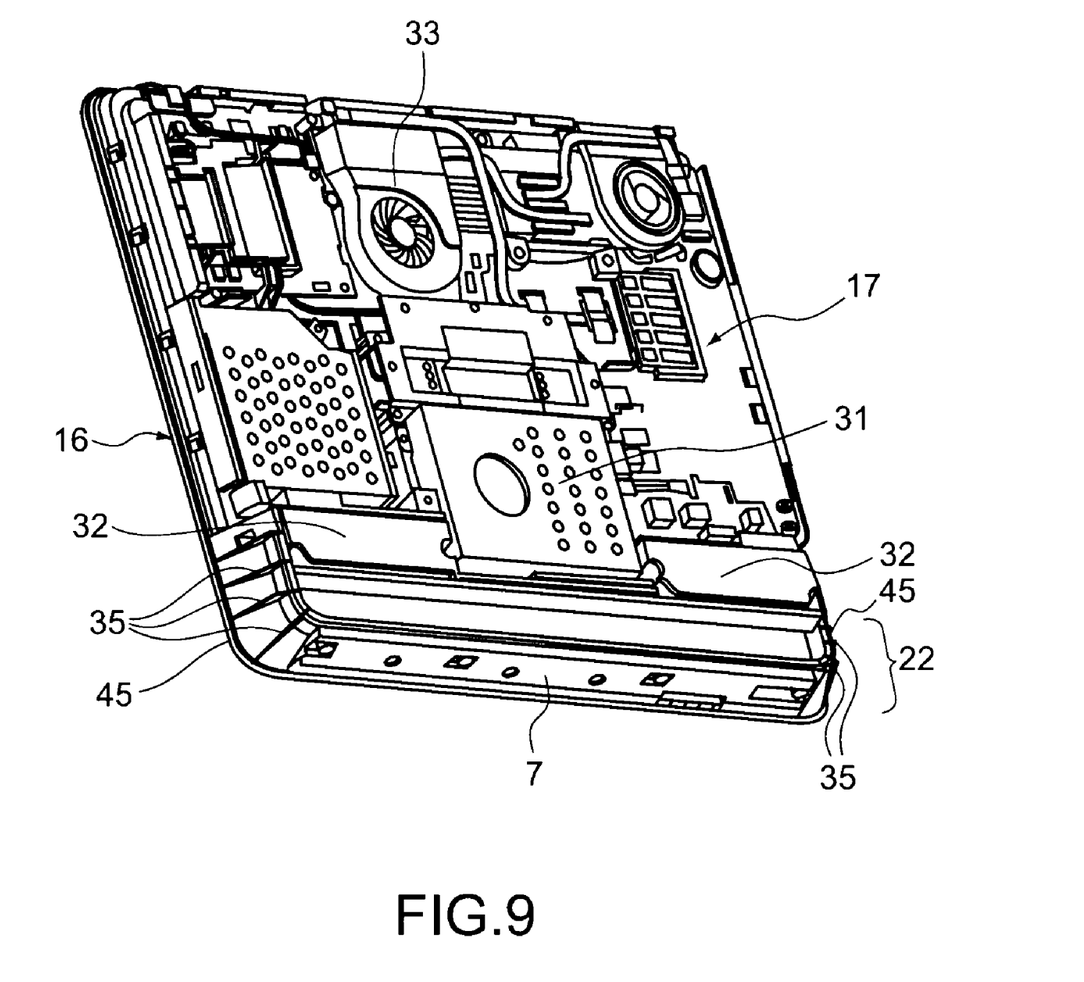
FIG. 9 is a perspective view of the information processing apparatus from which the back-side cover is removed.

FIG. 8 is a perspective view of a back-side cover of the information processing apparatus 2 shown in FIG. 1, and FIG. 9 is a perspective view of the information processing apparatus 2 from which the back-side cover is removed.

The information processing apparatus 2 includes a back-side cover 15, a front-side cover 16 from which the back-side cover 15 can be detached, and built-in components 17 accommodated in those covers. As shown in FIG. 9, in a state where the back-side cover 15 is removed, the built-in components 17 are accommodated inside the front-side cover 16.

As shown in FIG. 8, the back-side cover 15 includes a back-side cover support portion 18 that constitutes a part of the back surface side of the support portion 4. The back-side cover support portion 18 includes the base portion 4A and a pair of side plate portions 44 provided on both ends of the base portion 4A. At substantially the center of the back surface 27 of the back-side cover 15, a support member 19 for supporting the inclined information processing apparatus 2 from the back surface 27 side is provided.

As shown in FIG. 9, the front-side cover 16 includes a front-side cover support portion 22 that constitutes a part of the front surface side of the support portion 4. The front-side cover support portion 22 includes the cover portion 7 and a pair of side plate portions 45. The side plate portions 45 determine a height of the space K. A plurality of reinforcement ribs 35 for reinforcing the side plate portions 45 are formed on the side plate portions 45. The reinforcement ribs 35 are formed on a side opposed to the back-side cover support portion 18. As a result, when the front-side cover 16 and the back-side cover 15 are fit together, the reinforcement ribs 35 are not exposed on an outer side of the front-side cover 16 and back-side cover 15. The built-in components 17 are accommodated inside the front-side cover 16. Examples of the built-in component 17 include a CPU, an HDD unit 31, a speaker 32, and a cooling unit 33.

Figure 10:
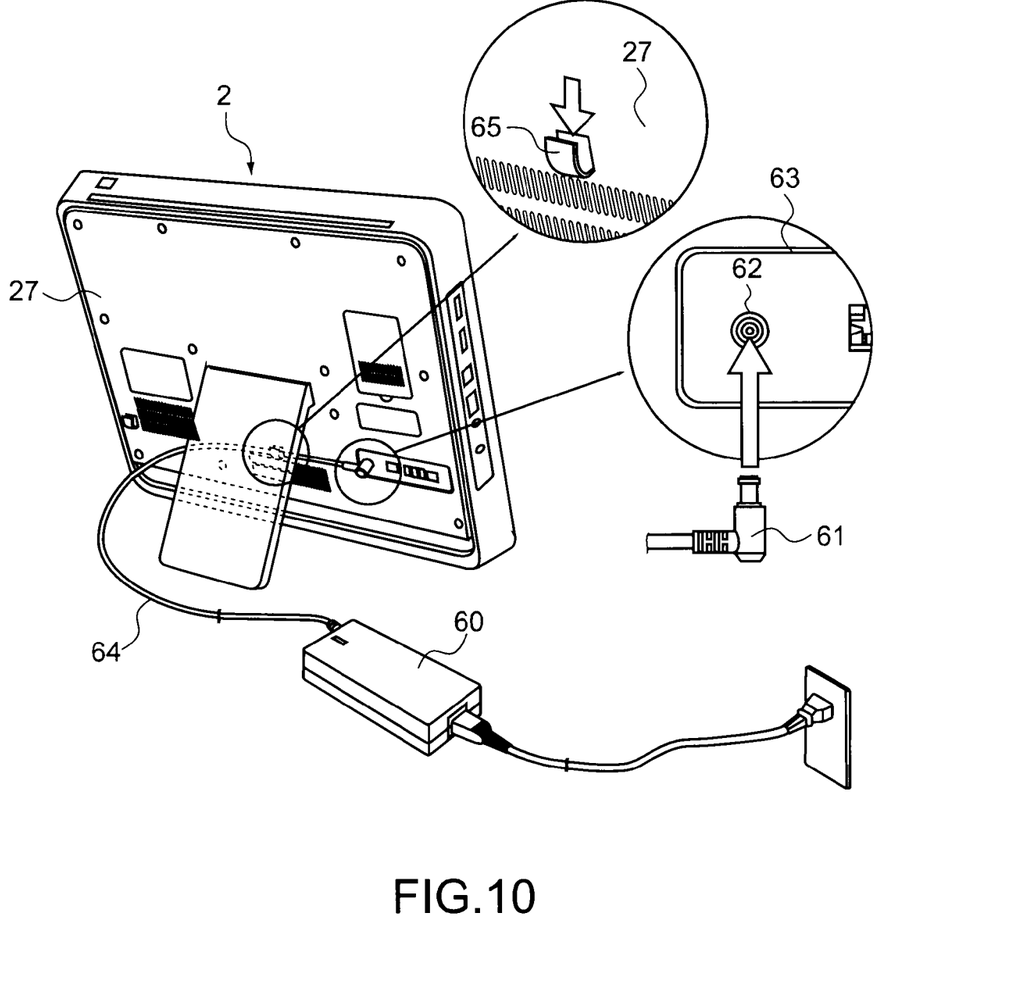
FIG. 10 is a perspective view of a cable clamp structure of the information processing apparatus.

FIG. 10 is a perspective view of a cable clamp structure of the information processing apparatus 2.

The information processing apparatus 2 includes, on the back surface 27, a connection portion 63 and a clamp portion 65. The connection portion 63 includes a connection portion 62 for connecting a plug 61 of an AC adapter 60, for example.

The clamp portion 65 is provided at a position apart from the connection portion 62. The clamp portion 65 clamps, for example, a cable 64 of the AC adapter 60 at a position apart from the connection portion 62. For example, the clamp portion 65 has a shape of a hook so that, when the cable 64 of the AC adapter 60 is hooked thereon, the cable 64 can positively be retained from the bottom.

Figure 11:
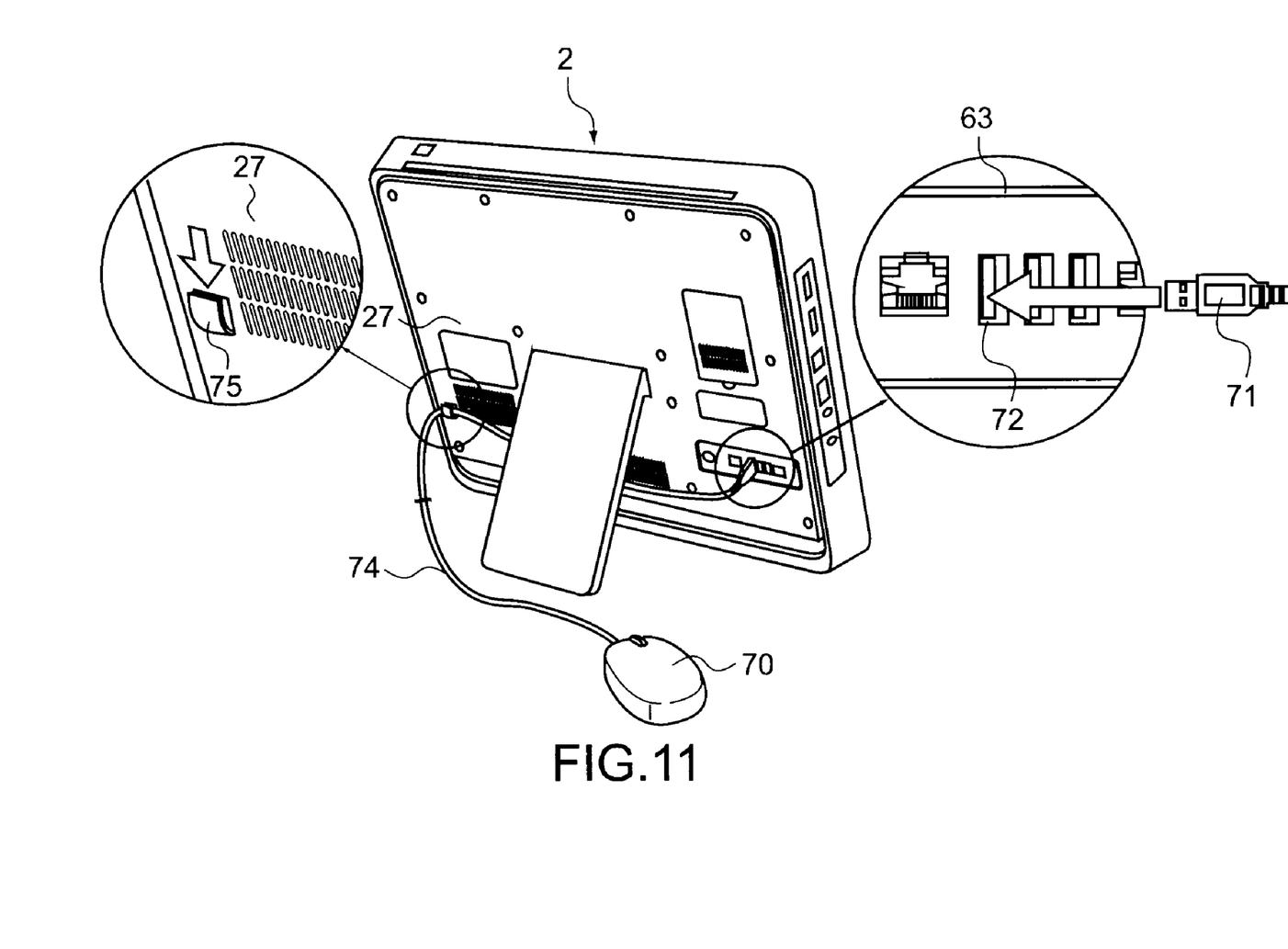
FIG. 11 is a perspective view of another cable clamp structure of the information processing apparatus.

FIG. 11 is a perspective view of another cable clamp structure of the information processing apparatus 2.

The information processing apparatus 2 includes a connection portion 63 and a clamp portion 75 on the back surface 27 thereof. The connection portion 63 includes a connection portion 72 for connecting a connection portion 71 of a mouse 70. The clamp portion 75 is provided at a position apart from the connection portion 72. The clamp portion 75 clamps, for example, a cable 74 of the mouse 70 at a position apart from the connection portion 72. For example, the clamp portion 75 has a shape of a hook so that, when the cable 74 of the mouse 70 is hooked thereon, the cable 74 can positively be retained from the bottom.

(Operation Etc.)

As described above, according to this embodiment, the information processing apparatus 2 includes the support portion 4, and the communication port portion 9 is provided so as to correspond to the mark 8 provided at the bottom plate portion 6 of the support portion 4. Therefore, the bottom plate portion 6 of the support portion 4 can be used not only for accommodating and placing the keyboard 3 in the space K below the main body portion 5, but also as the communication port portion 9, with the result that installation spaces of the information processing apparatus 2 and keyboard 3 can be saved. The support portion 4 is provided below the main body portion 5 of the information processing apparatus 2. Therefore, an installation area at a time of accommodating the information processing apparatus 2 and the keyboard 3 can be reduced. In other words, the support portion 4 can be used not only for supporting the main body portion 5 but also for accommodating the keyboard 3, with the result that it becomes possible to save installation spaces of the information processing apparatus 2 and the keyboard 3 as compared to a case where the support and accommodation are realized by different components.

While all-in-one systems are increasing in response to demands to save installation spaces, according to this embodiment, the information processing apparatus 2 can realize space saving of an accommodation space of the keyboard 3 and installation of the communication port portion 9 without impairing design. In particular, a flat arrangement surface 6a is provided to the information processing apparatus 2 at a position closest to a user, and the communication port portion 9 such as FeliCa (registered trademark) is provided below the arrangement surface 6a. Accordingly, the arrangement surface 6a can be used as an area for communication, thus improving usability for the user. For example, by the user bringing the noncontact-type IC card 20 close to the communication port portion 9, the communication port portion 9 can transmit/receive information to/from the noncontact-type IC card 20.

The base portion 4A is provided such that an angle θ1 is formed between the base portion 4A and the horizontal plane as shown in FIG. 3. The cover portion 7 is provided such that an angle θ2 is formed between the cover portion 7 and the horizontal plane. Therefore, when the base portion 4A of the information processing apparatus 2 is placed on a table or the like, the front surface 25 of the information processing apparatus 2 is inclined upward. At this time, the cover portion 7 is provided so as to be inclined with respect to the horizontal plane. As a result, since the support portion 4 can accommodate the keyboard 3 in an inclined state, it is possible to save more space.

Since the cover portion 7 is inclined by the angle θ2 with respect to the horizontal plane as shown in FIG. 3, the keyboard 3 is inclined when accommodated in the support portion 4. In this regard, a sheet (e.g., urethane sheet) (not shown) or the like may be disposed (attached) on (to) the bottom surface of the keyboard 3. As a result, a positional deviation of the keyboard 3 accommodated in the support portion 4 can be prevented from occurring.

As shown in FIG. 9, a plurality of reinforcement ribs 35 for reinforcing the side plate portions 45 are formed on the side plate portions 45 of the front-side cover support portion 22. Accordingly, the support portion 4 can be reinforced while realizing reductions in costs and weight as compared to a case where the side plate portions 45 are reinforced by other components such as a sheet metal.

The main body portion 5 of the information processing apparatus 2 is provided with, at a lower end portion thereof, the protrusion portion 40 that protrudes toward the space K. The protrusion portion 40 is provided plurally and symmetrically (symmetric in X direction) with, for example, a center of the information processing apparatus 2 in the width direction (X direction) as a center. An elastomer is used as a constituent material of the protrusion portions 40, for example. Consequently, when the keyboard 3 is accommodated in the space K of the support portion 4, the keyboard 3 can be pressed by the protrusion portions 40 near both ends thereof in a longitudinal direction from an upper side thereof so that a predetermined distance is kept between the upper surface side of the keyboard 3 and the lower end of the main body portion 5. As a result, it is possible to prevent the keys as press-type operation portions of the keyboard 3 from being pressed when accommodating the keyboard 3 in the support portion 4, for example, thus preventing unintentional operations from being made.

The main body portion 5 includes an inclined surface 26 inclined with respect to the front surface 25 of the main body portion 5 at the lower end of the main body portion 5. The inclined surface 26 is inclined downward from the front surface 25 side to the back surface 27 side of the main body portion 5. Accordingly, it is possible to enlarge an accommodation space of the keyboard 3 and, at the same time, prevent the keyboard 3 from being brought into contact with the support portion 4 when the keyboard 3 is accommodated in the space K of the support portion 4. Moreover, since the inclined surface 26 is provided to the main body portion 5, it becomes easier for the user to recognize a position of the mark 8 (communication port portion 9).

Because the speaker 32 is positioned at the lower end of the main body portion 5, the installation space of the information processing apparatus 2 in the width direction can be made smaller than in a case where the speaker 32 is positioned at both side portions of the main body portion 5. At this time, the speaker 32 is incorporated in the main body portion 5 while being inclined with respect to the inclined surface 26. Accordingly, the accommodation space of the keyboard 3 can be prevented from becoming smaller. Moreover, it is possible to prevent, at the time of accommodating the keyboard 3 in the support portion 4, the keyboard 3 from coming into contact with the main body portion 5 of the information processing apparatus 2.

As shown in FIGS. 10 and 11, the information processing apparatus 2 includes a clamp portion 65 or 75 at a position apart from the connection portion 62, 72, or the like on the back surface 27 of the main body portion 5. Therefore, the cable 64 of the AC adapter 60, the cable 74 of the mouse 70, or the like can be retained by the clamp portion 65 or 75 at a position apart from the connection portion 62, 72, or the like. At this time, it is possible to retain the cable 64 so that it does not at least go slack between the connection portion 62 and the clamp portion 65 or retain the cable 74 so that it does not at least go slack between the connection portion 72 and the clamp portion 75. As a result, it is possible to prevent the cable 64 or 74 from being drooped on a desk to block the space K, for example, and prevent the cable 64 or 74 from being tucked in when the keyboard 3 is accommodated in the support portion 4. Moreover, by retaining the cable 64 or 74 by the clamp portion 65 or 75, it is possible to prevent the cable 64 or 74 from being unplugged when the information processing apparatus 2, the keyboard 3, the mouse 70, or the like is being operated. It should be noted that a cable 80 may be retained by the clamp portion 65 or 75.

Such a communication port portion 9 may be incorporated on the keyboard 3 side. However, an area for installing the communication port portion 9 is smaller in the keyboard 3 than in the support portion 4. Therefore, if the communication port portion 9 is provided to the keyboard 3, design of the keyboard 3 may be impaired due to relationships in arrangement with respect to keys or other components included in the keyboard 3. Specifically, since there are a keyboard that requires the communication port portion 9 and a keyboard that does not require the communication port portion 9, design of the keyboard that does not include a communication port portion is impaired if the same design is used for producing those different types of keyboards.

On the other hand, since the communication port portion 9 is provided to the arrangement surface 6a of the support portion 4 and no other components are required to be provided to the arrangement surface 6a in this embodiment, design of the support portion 4, the keyboard 3, and the like is not impaired due to the communication port portion 9.

Another Embodiment

Figure 12:
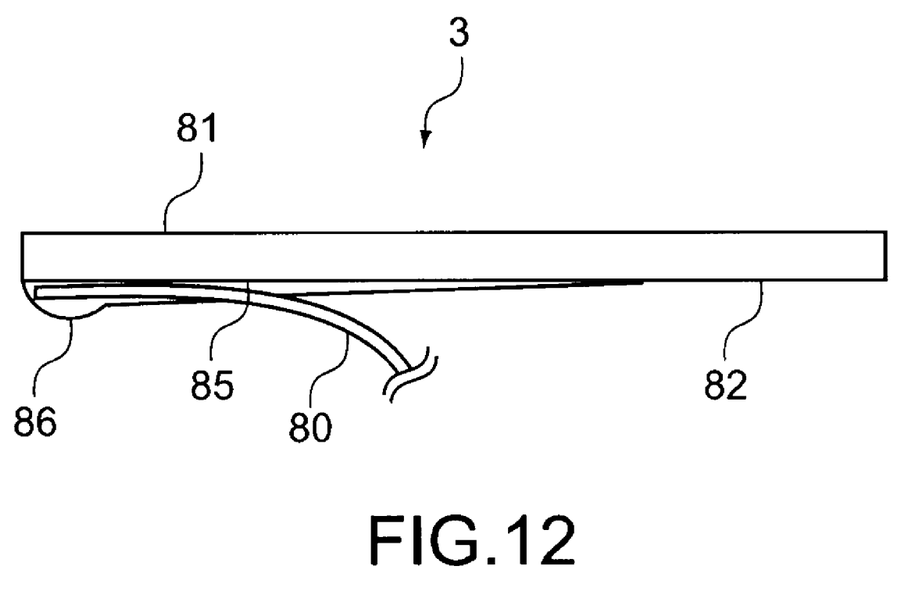
FIG. 12 is a side view of a keyboard according to another embodiment.

FIG. 12 is a side view of a keyboard according to another embodiment. It should be noted that in this embodiment and subsequent ones, descriptions on components that are the same as those of the above embodiment are denoted by the same reference numerals, and different points will mainly be described.

A keyboard 3 includes a guide groove 85 for guiding a cable 80 to a bottom surface 82 on the other side of a front surface 81 that includes keys and the like. The guide groove 85 is formed in a direction orthogonal to a longitudinal direction of the keyboard 3, for example. Accordingly, it is possible to provide the cable 80 along the guide groove 85 as shown in FIG. 12 when accommodating the keyboard 3 in the support portion 4 of the information processing apparatus 2 or after accommodating the keyboard 3. As a result, the cable 80 can be prevented from being tangled up with the information processing apparatus 2, the keyboard 3, and the like.

Moreover, the keyboard 3 includes an engagement protrusion portion 86 that engages with the bottom plate portion 6 of the support portion 4 when the keyboard 3 is accommodated in the space K of the support portion 4. The engagement protrusion portion 86 protrudes downward from the bottom surface 82 of the keyboard 3. Accordingly, the keyboard 3 can be accommodated in the support portion 4 in a stable state.

The present invention is not limited to the above embodiments, and various modifications can be made.

The above embodiments have shown the example where the communication port portion 9 is provided to the bottom plate portion 6 of the support portion 4. However, the present invention is not limited thereto, and the communication port portion 9 may be provided to, for example, the side plate portion 43 of the support portion 4. Even with such a structure, the user can easily bring the IC card 20 into contact with the communication port portion 9.

The above embodiments have shown the example where the cable 64 of the AC adapter 60 is hooked on the clamp portion 65 as shown in FIG. 10. However, it is also possible to hook the cable 80 of the keyboard 3 (see FIG. 1) on the clamp portion 65. Moreover, FIG. 10 has shown the example where the clamp portion 65 for retaining the cable 64 is provided at one position. However, another clamp portion having the same shape as the clamp portion 65 may be provided at a different position for retaining the cable 64. Accordingly, the cable 64 can positively be retained at the plurality of positions.

The above embodiments have shown the example where the cable 74 of the mouse 70 is hooked on the clamp portion 75 as shown in FIG. 11. However, it is also possible to hook the cable 64 of the AC adapter 60 on the clamp portion 75, for example. Moreover, FIG. 11 has shown the example where the clamp portion 75 for retaining the cable 74 is provided at one position. However, another clamp portion having the same shape as the clamp portion 75 may be provided at a different position for retaining the cable 74. Accordingly, the cable 74 can positively be retained at a plurality of positions.

The present application contains subject matter related to that disclosed in Japanese Priority Patent Application JP 2008-223678 filed in the Japan Patent Office on Sep. 1, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a main body portion including a display portion;
a support portion that supports the main body portion and includes a bottom plate that forms a space below the main body portion in which information equipment connectable to the main body portion can be accommodated;
a communication portion that is provided to the bottom plate and performs communication with a noncontact-type communication medium; and
an authentication processing portion to perform authentication processing based on information from the noncontact-type communication medium received by the communication portion, wherein
the bottom plate portion is provided with, on an upper surface thereof, a mark that indicates a position of the communication portion,
the communication portion is provided at a position corresponding to the mark,
the support portion includes a side plate portion that determines a height of the space,
one surface of the side plate portion is provided with a reinforcement portion,
a ceiling surface forming the space is provided with a protrusion portion for preventing an unintentional operation to a press-type operation portion of the information equipment accommodated in the space, and
the ceiling surface forming the space includes an inclined surface that is inclined downward from a front surface side to a back surface side of the main body portion.

2. The information processing apparatus according to claim 1,
wherein a speaker portion is provided in correspondence with the inclined surface.

3. The information processing apparatus according to claim 2,
wherein the main body portion includes a retention portion that is provided on the back surface on the other side of the front surface, the retention portion being capable of holding a cable connectable to the main body portion at a position apart from a terminal to which the cable is connected.

4. The information processing apparatus according to claim 3, wherein the main body portion includes an information processing portion for generating information to be displayed on the display portion.

5. An electronic apparatus system, comprising:
an information processing apparatus including
- a main body portion including a display portion;
- a support portion that supports the main body portion and includes a bottom plate that forms a space below the main body portion; and
- a communication portion that is provided to the bottom plate and performs communication with a noncontact-type communication medium; and
- an authentication processing portion to perform authentication processing based on information from the noncontact-type communication medium received by the communication portion, wherein
- the bottom plate portion is provided with, on an upper surface thereof, a mark that indicates a position of the communication portion,
- the communication portion is provided at a position corresponding to the mark,
- the support portion includes a side plate portion that determines a height of the space,
- one surface of the side plate portion is provided with a reinforcement portion,
- a ceiling surface forming the space is provided with a protrusion portion for preventing an unintentional operation to a press-type operation portion of the information equipment accommodated in the space, and
- the ceiling surface forming the space includes an inclined surface that is inclined downward from a front surface side to a back surface side of the main body portion; and
information equipment that is connectable to the main body portion and capable of being accommodated in the space.

* * * * *